Patented Sept. 15, 1942

2,296,225

UNITED STATES PATENT OFFICE 2,296,225

NITROGENOUS CONDENSATION PRODUCTS AND A PROCESS OF PRODUCING SAME

Heinrich Ulrich, Ludwigshafen-on-the-Rhine, Germany, assignor, by mesne assignments, to General Aniline & Film Corporation, New York, N. Y., a corporation of Delaware No Drawing. Application December 12, 1940, Serial No. 369,866. In Germany August 7, 1935

12 Claims. (Cl. 260—239)

The present application is a continuation-in-part of application Ser. No. 93,767, filed in the name of Heinrich Ulrich on August 1, 1936.

The present invention relates to new nitrogenous condensation products and a process of producing same.

I have found that very valuable nitrogenous products are obtained by causing monomeric 1.2-alkylene imines (ethylene imines) or the non-crystalline high molecular products obtained therefrom by polymerization to react with organic compounds which are free from carboxylic and modified carboxylic groups but contain the grouping

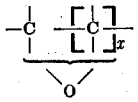

wherein $x$ stands for one of the numbers 0, 1 and 2. It makes no substantial difference in the course of reaction whether the monomeric alkylene imines or their non-crystalline high molecular polymerization products are employed. The latter are preferably obtained by catalytic polymerization according to the Patent 2,182,306. These products have a molecular weight which is more than three times that of the monomeric imine; they are not so thinly liquid as the monomeric compounds but from viscous to waxy products. Most probably they are mixtures of polymers of different degree of polymerization. For example ethylene imine, methylethylene imine, alpha-beta-butylene imine, alpha-beta-dodecylene imine and their high molecular polymerization products are suitable for the process.

The said monomeric or polymerized 1.2-alkylene imines may be caused to react for example with alkylene oxides or substances which are capable of reacting like alkylene oxides, as for example ethylene oxide, 1.2- or 1.3-propylene oxide, 1.2- or 1.3-butylene oxide, glycide and epichlorhydrin.

The 1.2-alkylene imines may also be condensed with carbonyl compounds (in which the oxygen atom shown in the above formula is attached to one single carbon atom), viz. aldehydes and/or ketones, as for example with formaldehyde, acetaldehyde or their polymerization products, with oleyl aldehyde or benzaldehyde or with acetone, methyl ethyl ketone, benzophenone and the like or mixtures of these substances.

The reaction conditions are adapted to the initial materials employed. The reaction usually takes place at temperatures between room temperature and 100° C., as for example at from 50° to 60° C., but higher or, in the case of especially reactive initial materials, lower temperatures may be advantageous. Equimolecular proportions of the initial materials may be allowed to react with each other or one of the components may be caused to react in excess. Depending on the nature and relative proportions of the initial materials, and in some cases on the reaction conditions, products which are soluble or insoluble in water can be obtained. The use of solvents or diluents, as for example water, alcohol, ether, cyclohexanone, toluene, carbon tetrachloride or chlorbenzene is frequently of advantage. The reaction may be carried out under increased pressure; especially when initial materials are employed which react only with difficulty it is preferable to carry out the condensation in a closed vessel under pressure. It may be advantageous to work in the presence of condensing agents; for example when condensing 1.2-alkylene imines with aldehydes or ketones the presence of phosphoric acid, phosphorus pentoxide, aluminium chloride, zinc chloride or boron fluoride is of advantage. When compounds containing exchangeable halogen are employed it is frequently preferable to work in an alkaline medium.

The condensation, for example with aldehydes or ketones, may be carried out with an addition of other substances capable of condensation, as for example with an addition of urea or its substitution products, such as dimethylolurea and thiourea, or of phenols, or of amines, in particular amines of high molecular weight, such as acetylamine or oleylamine, or of acrylic or maleic acid and their derivatives, or of styrene. An addition of natural or synthetic rubber or of natural or synthetic resins is also frequently of advantage.

It may be of advantage to condense the 1.2-alkylene imines or their non-crystalline high molecular polymerization products simultaneously with two or more of the said compounds or first with one of the said compounds, the reaction product being condensed with another reactive substance. For example reaction products of the imines with fatty acids, fatty acid chloride, chlorocarbonic esters, sulphonic acid chlorides or chlorinated fatty acid chlorides may be first prepared and then brought into reaction with aldehydes, ketones or alkylene oxides. Water-soluble condensation products of alkylene imines with alkylene oxides may be converted into urethanes or, by subsequent treatment with aldehydes, into insoluble products. Products which are still basic may be employed in the form of salts with mineral or organic acids, as for example with fatty acids.

The condensation products may be subsequently treated with any desired amounts of alkylene oxides or may be alkylated or peralkylated or substituents, as for example carboxylic, sulphonic, sulphuric ester or phosphoric acid groups, may be introduced. The introduction of substituents may also be effected by employing, for the reaction with the alkylene imines, compounds which already contain the desired substituents. Soluble condensation products derived from 1.2-alkylene imines or their polymerization products and alkylene oxides may be subjected to a treatment with substances which react with them with the introduction of groups which influence their solubility; for example they may be converted into insoluble products by treatment with aldehydes or ketones. By condensation for example with chlorocarbonic acid esters, the condensation products may be converted into bodies similar to urethanes.

A further possiblity in treatment consists in the introduction of acyl groups; either the finished condensation products or one or both of the initial components may be acylated. The acylation may be carried out by reaction with fatty acid chlorides, fatty acid esters, acid anhydrides or sulphonic acid chlorides, as for example toluene sulfochloride. Furthermore two or more of the said methods of treatment may be combined together or carried out consecutively.

The products obtainable according to this invention are colorless or slightly colored viscous liquid, or wax-like, or solid substances many of which are difficultly soluble or insoluble in water but soluble in organic solvents, the nature of the products obtained depending on the initial materials and working conditions employed.

The products are suitable for a great variety of purposes; for example they may serve alone or together with other suitable substances as assistants for the pharmaceutical, cosmetic, textile, leather, lacquer, rubber and like industries. For example they may be added with advantage to the spinning baths in the preparation of artificial silk; they increase the affinity of artificial silk to acid dyestuffs. The products may also be employed as additions in dyeing, printing, dressing, stripping, fulling, levelling, washing, dispersing and wetting or as softening or flotation agents. The products obtained when employing aldehydes or ketones may be used for example for impregnating and dressing textiles, leather, paper, straw and the like and for rendering textiles such as artificial silk crease-proof or slide-proof. Some of the products impart a water-repelling action to textiles treated therewith. They increase the fastness to water and washing of dyeings. The condensation products may also be employed in tanning. In many cases it is preferable to employ the products in a dissolved or dispersed form, for example while employing dispersing agents, as for example salts of the sulphuric esters of fatty alcohols or true sulphonic acids of aliphatic compounds of high molecular weight.

It may frequently be of advantage to produce the new condensation products directly on the material to be impregnated, for example by impregnating a fabric with a solution or dispersion of an alkylene imine, if desired polymerizing the latter on the fibre and then treating the fabric for example in a solution of formaldehyde.

The following examples will further illustrate the nature of this invention but the invention is not restricted to these examples. The parts are by weight.

*Example 1*

1 molecular proportion of the reaction product of ethylene imine with the equimolecular amount of the mixture of alkyl bromides which correspond to the alcohols obtainable by reduction of the fatty acids of palm kernel oil is caused to react with 1 or 10 or more molecular proportions of ethylene oxide. Products are obtained which are valuable as assistants in the textile industry, for example as additions in dyeing in acid baths, or as agents for the animalization of artificial silk. Polymerized ethylene imine may be employed instead of the monomeric ethylene imine. The said mixture of alkyl bromides may also be replaced by the mixture of the chlorides of the fatty acids contained in palm kernel oil or by benzyl chloride or toluene sulphonic acid chloride.

*Example 2*

20 parts of monomeric ethylene imine are dissolved in 100 parts of water. 100 parts of ethylene oxide are led in. The reaction mixture is dehydrated in vacuo. It is an oily liquid which is eminently suitable for the treatment of textiles.

*Example 3*

35 parts of monomeric propylethylene imine are diluted with 20 parts of water and caused to react at elevated temperature, as for example 50° C., with the equimolecular proportion of epichlorhydrin. The reaction product is dehydrated in vacuo. It may be employed for example as a preservative against moths.

*Example 4*

20 parts of polymerized ethylene imine are mixed with 20 parts of water. While stirring at 30° C., 20 parts of ethylene oxide are led in and the resulting product is dehydrated in vacuo. A highly viscous liquid is obtained which is suitable for stripping dyeings of all kinds.

Epichlorhydrin, glycide, propylene oxide or the like may also be employed instead of ethylene oxide. Alcohol, cyclohexane, toluene or other organic liquids may be used as diluents instead of water.

*Example 5*

50 parts of 30 per cent formaldehyde are added to 43 parts of ethylene imine and the mixture is then heated for two hours at 60° C. An oily condensation product still soluble in water is obtained which may be employed for example for the production of crease-proof effects.

*Example 6*

From 100 to 200 parts of formaldehyde (30 per cent strength) are added to 43 parts of polymerized ethylene imine and the mixture is then heated for two hours at 60° C. A valuable condensation product is obtained which is insoluble in water but soluble in organic solvents. Reaction products having different properties are obtained depending on the amount of formaldehyde and the temperature or duration of the reaction employed. Products insoluble in organic solvents may also be produced.

Example 7

Cotton or artificial silk is treated at for example 20° or 60° C. with a solution of polymerized ethylene imine in carbon tetrachloride in an amount of 10 per cent with reference to the weight of the cotton. The goods are then subjected to a treatment with 30 per cent formaldehyde. By this treatment they are animalized to a great extent (i. e. they become considerably more absorptive for acid wool dyestuffs) and moreover may be wetted very rapidly.

By adding other compounds capable of condensation, as for example acetic anhydride or amines of high molecular weight, such as oleylamine, a specially soft touch or a high resistance to creasing may be imparted to the fabric.

Example 8

400 parts of liquid water-soluble polymerized ethylene imine are mixed while stirring with 40 parts of a chlorinated paraffin wax containing about 3 chlorine atoms per molecule. The temperature rises up to from 110° to 120° C. The practically colorless product obtained is treated with ethylene oxide, a water-soluble product being obtained which is very suitable for incorporation with artificial silk spinning masses or for the after-treatment of artificial silk.

Example 9

350 parts of polymeric butyl ethylene imine are heated in a closed vessel with 88 parts of ethylene oxide (or 116 parts of propylene oxide or 148 parts of glycide) at 130° to 160° C. If a constant pressure is obtained the reaction is finished. The reaction product may be used with advantage as an addition for spinning masses in the production of artificial silk.

Polymeric hexyl or dodecylethylene imine may be employed instead of polymeric butyl ethylene imine.

The reaction may be carried out in the presence of water. In this case the reaction product is dried in vacuo.

Example 10

120 parts of N-phenylethylene imine are reacted with 880 parts of ethylene oxide, the latter being added slowly while gradually raising the temperature to about 50° C. A water-soluble product is obtained which may be employed as a levelling agent and which possesses a disinfecting action.

N-phenylethylene imine may be replaced by N-cyclohexyl or N-benzyl ethylene imine.

Valuable products are also obtained by condensation of ethylene imine with ethylene oxide and subsequent treatment with cyclohexyl chloride or benzyl bromide.

Example 11

71 parts of butylene imine

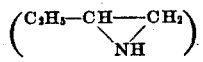

are warmed with 44 parts of ethylene oxide or 58 parts of propylene oxide in a closed vessel at 60° to 70° C. The reaction product may be added with advantage to spinning baths for the production of artificial silk.

Example 12

99 parts of isohexylene imine or 183 parts of dodecylene imine are warmed with 44 parts of ethylene oxide in a closed vessel at from 60° to 70° C. A reaction product is obtained which may be added with advantage to spinning baths for the production of artificial silk.

Example 13

43 parts of ethylene imine are cautiously warmed with 70 parts of croton aldehyde on the water bath. A faintly colored condensation product is obtained.

Instead of monomeric ethylene imine polymeric ethylene imines of different degree of polymerization and instead of croton aldehyde mixtures of the same with other aldehydes may be employed and the proportions may be varied considerably.

Example 14

200 parts of water-soluble polymerized ethylene imine are condensed with 268 parts of oleic aldehyde. The yellow colored condensation product may be used for different purposes in the textile industry. It may also be produced on the fibre.

Example 15

100 parts of monomeric butyl ethylene imine are warmed on the water bath with 88 parts of acetaldehyde or the corresponding amount of benzaldehyde in alcoholic solution while stirring. A valuable artificial mass is obtained.

If some parts of phosphoric acid, phosphorus pentoxide, aluminium chloride or zinc chloride are added or a slow current of boron fluoride is led in, the reaction proceeds especially smoothly and satisfactorily.

Example 16

100 parts of propylethylene imine are condensed with 166 parts of aldol while stirring. The reaction proceeds especially smoothly if butanol is added as a diluent.

Example 17

The product obtainable by condensing 400 parts of water-soluble polymeric ethylene imine with 300 parts of palm kernel fatty chloride or dichlorstearyl chloride is condensed with formaldehyde, an insoluble product suitable for the production of lacquers and varnishes being obtained. The product may also be incorporated with spinning masses for the production of artificial silk or applied in emulsified form, to ready-made artificial silk. The product may also be produced in the spinning mass or on the ready artificial silk. In dependence on the fatty component employed a water-repelling and/or softening effect is obtained.

Instead of employing the said condensation product the products obtained by condensation of polymeric ethylene imine and the corresponding amounts of coco fatty acid chloride or free coco fatty acid or the chlorocarbonic acid octodecyl ester may be used.

Example 18

58 parts of acetone are stirred with 43 parts of ethylene imine whereby the temperature rises to about 40° to 50° C. A water-soluble condensation product is obtained which may be converted into insoluble products by condensation with aldehydes. Valuable condensation products are also obtained if cyclohexanone is employed instead of acetone.

Example 19

440 parts of polymeric ethylene imine are warmed with 106 parts of benzaldehyde while stirring vigorously. By a vivid reaction a condensation product is formed which is only difficultly swellable in water. Instead of benzaldehyde the equimolecular amount of benzophenone and instead of polymeric ethylene imine the monomeric compound may be employed.

Example 20

44 parts of polyethylene imine are condensed with 8.8 parts of ethylene oxide. 18 parts of an about 30 per cent aqueous solution of the condensation product thus obtained are mixed while stirring with 7 parts of chlorocarbonic acid butyl or octyl ester. With vigorous reaction there is formed a urethane-like compound which has an excellent emulsifying power and which may also be used as a softening agent for artificial compositions.

Example 21

88 parts of polyethylene imine are condensed with 40 parts of ethylene oxide. An about 60 per cent solution of the condensation product thus obtained is caused to react with oleic acid chloride. A vigorous reaction takes place as the result of which soluble, or emulsifiable, or glassy solid masses are obtained depending on the amount of oleic acid chloride used.

By aftertreating the said products with formaldehyde, water-insoluble products are obtained.

Example 22

44 parts of polyethylene imine are reacted with 8.8 parts of ethylene oxide. 53 parts of the reaction product thus obtained are mixed with 37 parts of chloracetic acid. By stirring the mixture, condensation with the evolution of heat takes place, a glass-like solid mass thus being formed. The solution of the product in caustic soda solution has a good wetting and foaming power.

Example 23

44 parts of polyethylene imine are reacted with 8.8 parts of ethylene oxide. 53 parts of the reaction product thus obtained are caused to react with 100 parts of the sodium salt of benzyl chloride sulphonic acid. A water-soluble substance of good foaming and wetting power is obtained.

Example 24

440 parts of polymerized ethylene imine are reacted with 44 parts of ethylene oxide. 480 parts of the product thus obtained are slowly mixed in the water-bath while stirring with 283 parts of the chlorocarbonic acid ester of commercial lauryl alcohol. A reaction product is obtained which imparts a pleasant soft touch to artificial silk and considerably improves its absorption of dye.

Example 25

176 parts of ethylene oxide are condensed with 440 parts of polymerized ethylene imine. The product thus obtained is caused to react with 300 parts of stearic acid chloride while stirring on the water-bath or at from 150° to 160° C. A product is obtained which may be used as softening agents and as a cleansing agent.

Stearic acid chloride may also first be caused to act on the said polyethylene imine-ethylene oxide condensation product, and then acetyl chloride or butyric acid chloride, whereby similar products are obtained.

Example 26

336 parts of a condensation product prepared from ethylene oxide and C-propyl ethylene imine are mixed with 300 parts of oleic acid chloride while stirring and heating. The reaction product is a good softening agent for artificial compositions. It increases the dye-absorption of artificial fibres to a considerable extent.

Example 27

43 parts of water-soluble polymerized ethylene imine and 250 parts of the mixture of alkyl bromides corresponding to the fatty acids contained in palm kernel oil are heated at from about 50° to 60° C. for three hours while stirring. As soon as a sample withdrawn from the reaction mixture is soluble in water to give a clear solution, the reaction is interrupted.

A textile fabric is treated with a solution of the said product (or of a urethane or acylation product derived therefrom) in a suitable solvent and then kept in motion in a bath containing 20 grams of formaldehyde per liter. After drying, the fabric has an excellent fastness to creasing and a soft touch.

Example 28

Formaldehyde is allowed to act in excess on the product obtainable according to the first paragraph of the preceding example. An artificial resin is obtained which is capable of various uses.

Instead of the said initial material, its reaction products with acylating agents or sulphonating agents may be used.

What I claim is:

1. The process of producing nitrogenous products which comprises causing a member selected from the class consisting of monomeric 1.2-alkylene imines and their non-crystalline high molecular polymerization products to react with an organic carbonyl compound free from carboxylic and modified carboxylic groups and selected from the class consisting of aldehydes and ketones.

2. The process of producing nitrogenous products which comprises causing a member selected from the class consisting of monomeric 1.2-alkylene imines and their non-crystalline high molecular polymerization products to react with an aldehyde.

3. The process of producing nitrogenous products which comprises causing a member selected from the class consisting of monomeric 1.2-alkylene imines and their non-crystalline high molecular polymerization products to react with a ketone.

4. Nitrogenous condensation products obtained by condensing the class consisting of monomeric 1.2-alkylene imines and their non-crystalline high molecular polymerization products with an organic carbonyl compound capable of readily undergoing condensation reactions, the said compound being free from carboxylic and modified carboxylic groups and selected from the class consisting of aldehydes and ketones.

5. Nitrogenous condensation products obtained by condensing a member selected from the class consisting of monomeric 1.2-alkylene imines and their non-crystalline high molecular polymerization products with an aldehyde.

6. Nitrogenous condensation products obtained by condensing a member selected from the class consisting of monomeric 1.2-alkylene imines and their non-crystalline high molecular polymerization products with a ketone.

7. The process as defined in claim 2, wherein the aldehyde is formaldehyde.
8. The process as defined in claim 2, wherein the aldehyde is benzaldehyde.
9. The process as defined in claim 3, wherein the ketone is acetone.
10. The product as defined in claim 5, wherein the aldehyde is formaldehyde.
11. The product as defined in claim 5, wherein the aldehyde is benzaldehyde.
12. The product as defined in claim 6, wherein the ketone is acetone.

HEINRICH ULRICH.